United States Patent [19]

Romero

[11] Patent Number: 5,033,046

[45] Date of Patent: Jul. 16, 1991

[54] DEVICE OF X-RAY INTENSIFYING AND ANTI-DIFFUSION SCREENS FOR INTRA-ORAL DENTAL RADIOGRAPHIC PLATES

[76] Inventor: Jose M. Romero, Puan 1636, Buenos Aires, Argentina

[21] Appl. No.: 410,836

[22] Filed: Sep. 22, 1989

[51] Int. Cl.[5] .............................................. G03B 42/04

[52] U.S. Cl. .................................... 378/169; 378/154; 378/168; 378/185; 378/186

[58] Field of Search ............... 378/154, 167, 168, 169, 378/185, 186; 250/483.1

[56] References Cited

U.S. PATENT DOCUMENTS

| | | | |
|---|---|---|---|
| 3,848,136 | 11/1974 | Seldin | 378/169 |
| 4,108,308 | 8/1978 | Franke et al. | 378/169 |
| 4,142,101 | 2/1979 | Yin | 250/483.1 |

FOREIGN PATENT DOCUMENTS

| | | | |
|---|---|---|---|
| 0779592 | 7/1957 | United Kingdom | 378/186 |

*Primary Examiner*—Carolyn E. Fields
*Assistant Examiner*—David P. Porta
*Attorney, Agent, or Firm*—Edmund M. Jaskiewicz

[57] ABSTRACT

A device of x-ray intensifying and anti-diffusion screens, for intra-oral dental radiographic plates of the kind employing a hermetic chassis cassette with a front and a back protective plate and having at least one intensifying plate emulsified with "rare earths", preferably gadolinium or lanthanum salts, related to one of the faces of the radio-graphic film to which it is faced. There is also an anti-diffusion plate made of metallic threads of predetermined thickness arranged in horizontal and vertical rows. This anti-diffusion plate is interposed between the object to by x-rayed and the intensifying screen and radiographic film, presenting between the anti-diffusion reticulated plate and the front intensifying screen, a separating plate of compressible material, and between the back protective plate and the back intensifying plate and/or the radiographic film, a plate of non-radiographic material, preferably lead.

3 Claims, 2 Drawing Sheets

Figure 5:
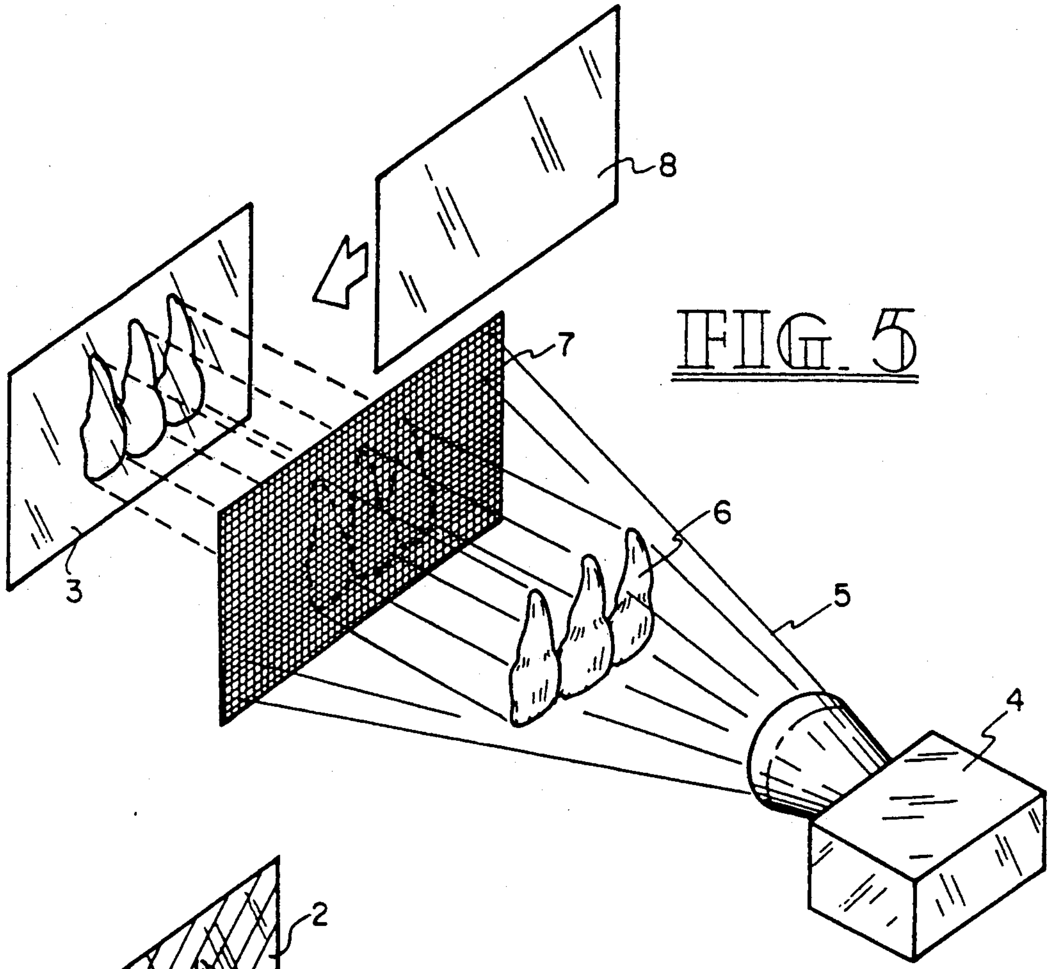
Figure 4:
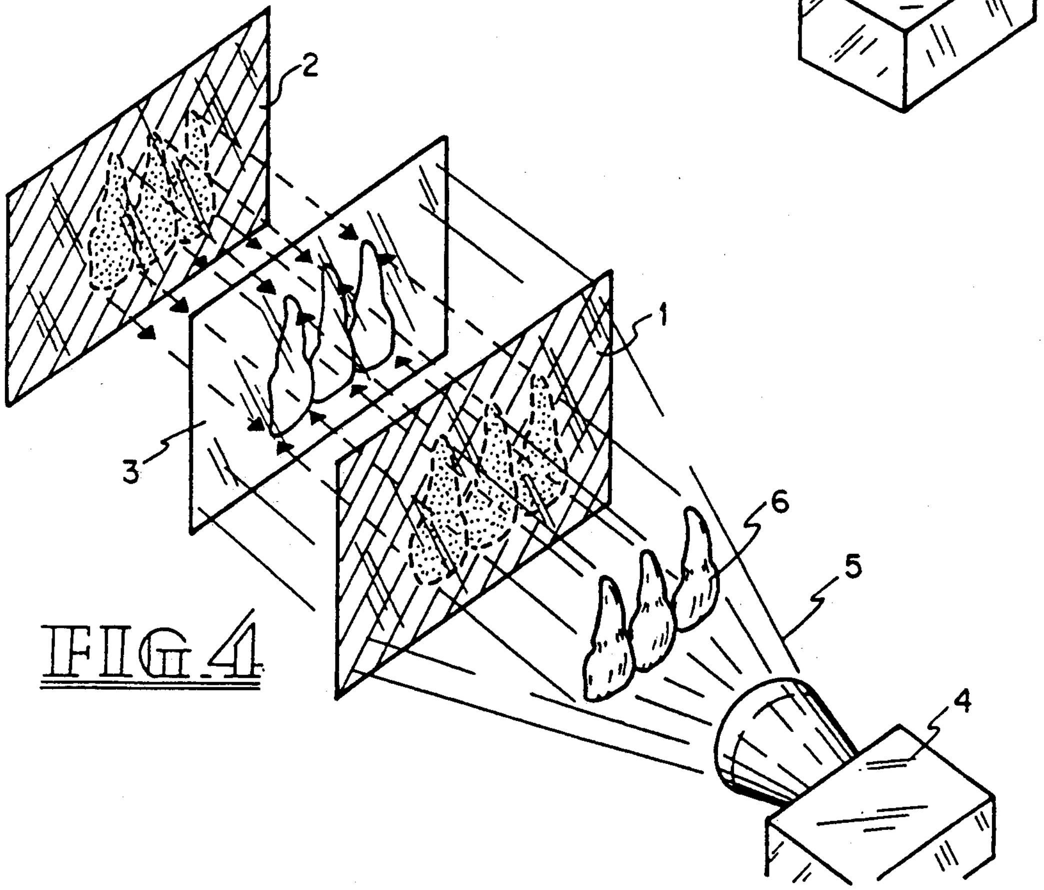

FIG. 1
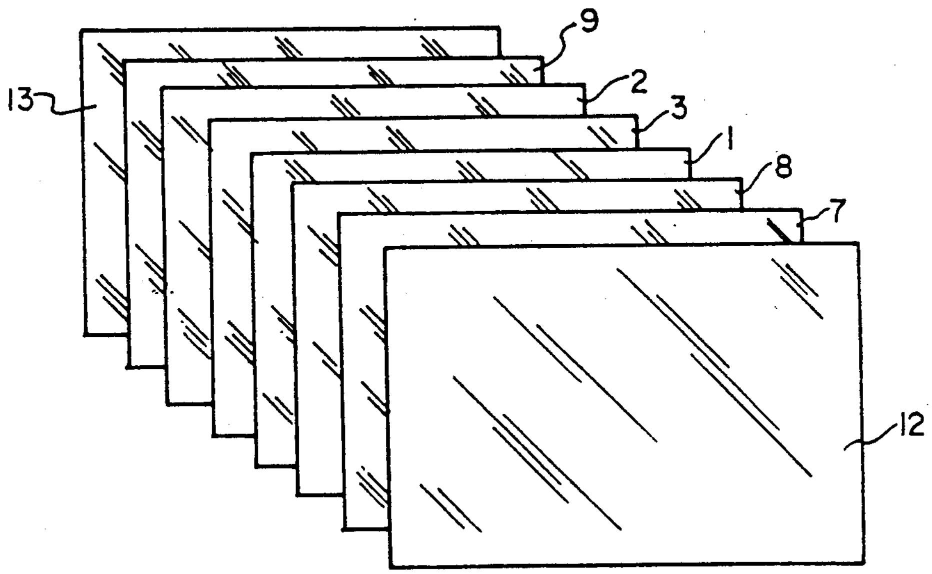
FIG. 2
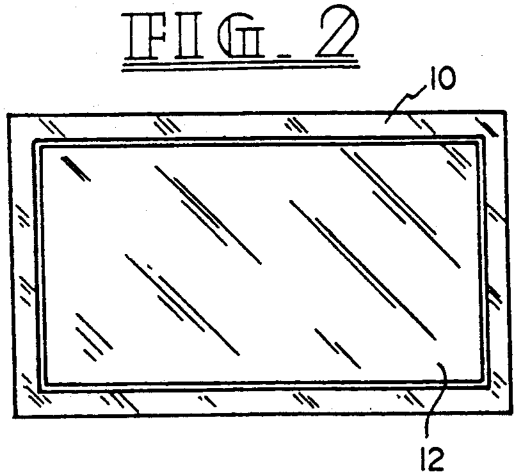
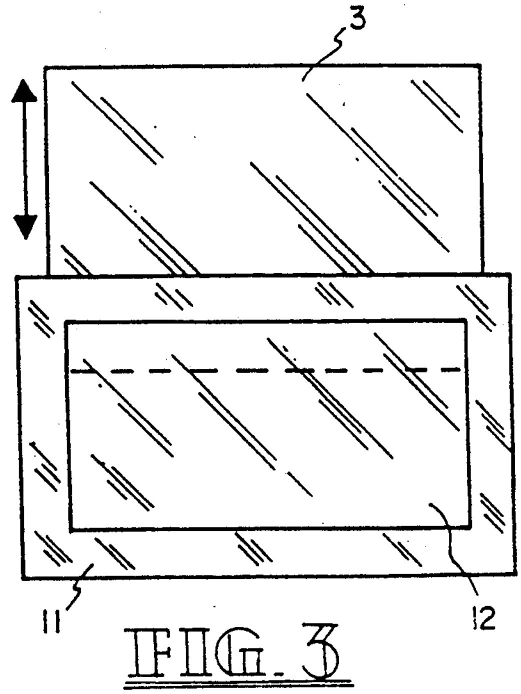
FIG. 3

DEVICE OF X-RAY INTENSIFYING AND ANTI-DIFFUSION SCREENS FOR INTRA-ORAL DENTAL RADIOGRAPHIC PLATES

The spirit that has prevailed to shape the idea that resulted in this invention arises from the intention to supply a chassis or cassette, whether disposable or not, comprising the addition to the conventional radiographic film, of one or two intensifying screens and an anti-diffusion plate, that converge to allow the obtention of an intra-oral dental X-ray of a higher quality definition than all devices known at present and a lower radiation emission.

In the state of the art in intra-oral dental radiology, a two-faced emulsified radiographic film is used, the emulsion being technologically conditioned to be mainly impressed by the X-ray wave length.

In order to protect this film against the action of the visible light and the humidity from the patient's saliva, it is packed in a hermetic case protecting it against the above mentioned actions.

In this system of conventional intra-oral dental radiology, the necessary X-ray radiation is very high, which is dangerous for both the patient's and the operator's health. Furthermore, the intensity of the radiation used damages the X-ray apparatus, and requires at the same time the use of a radiographic plate having a high content of silver salts in its emulsion which results in a high commercial cost product.

In the experimental examples carried out, the differences between the conventional and what has been proposed in this invention are clearly established.

There follow two examples: A and B

In Case A, X-rays were taken of the upper premolar area in a 43 year old male patient using the traditional system and the proposed system.

Both radiologic films were submitted to the same technical parameters, namely: the same photographic processing chemical conditions in terms of development and fixing times; the same illumination conditions, the same dental piece, the same position and ray incidence, and the results were:

For the conventional system, the exposure (radiation) time was 1.25 seconds.

For the proposed system, exposure time was 0.5 seconds.

In the opinion of five dentists consulted in this regard, the images in each case provided a diagnosis advantage because of a better definition of structures for the proposed system.

It should be observed that a 60 percent reduction of radiation for the patient was attained and at the same time, the quality of the image obtained is higher which enables the professional to give a more accurate diagnosis.

In Case B, X-rays were taken of the lower incisors in an 18 year-old female patient using the conventional and the proposed systems. Working conditions were the same as in Case A. Here are the results:

For the conventional system an exposure (radiation) time of 0.8 seconds was used. For the proposed system 0.4 seconds were used, since it was the minimum admitted by the X-ray equipment utilized.

It should be pointed out that not even an intensifying screen is used in conventional intra oral dental radiology, but its principle is based on the adoption of a film sensitometrically emulsified to the X-ray wave length.

The proposed system is based on the principle of using the X-ray light conversion phenomenon, which allows the reduction of radiation illuminating at the same time the emulsion in the film with its fluorescence.

As from this it is possible to get and recreate single-emulsion films, of smaller silver halogenide grains, and also small grains in the salt composition in the intensifying screen, which together have as practically demonstrated result a better definition of the structures under research. Moreover, when dealing with a single emulsion film with a lower silver halogenide content and very fine grains, the chemical veil to which any film is exposed just because of having to pass through a developer, to transform the latent image into a real image, is significantly reduced.

In order to put the above-mentioned into practice, a polyester support having a thin Gadolinium salt emulsion is taken.

An X-ray exposure is to fall upon the same, in a semi dark environment, and it shall be possible to observe that it reacts emitting visible light in the green wave length.

Next, we take a single-face emulsified radiographic film, whose emulsion has been sensitometrically developed to pick up with a higher sensitivity, the light in the shades of green.

This is added to the reinforcing screen and the X-ray tube is focused on this set and, for example, the tip of the thumb is interposed and the X-ray shot is made.

The thumb anatomical structure is reflected in the reinforcing screen as light which impresses the sensitive material producing the latent image which when developed shall produce the real image mentioned in cases A and B.

The reinforcing screen may be included together with the radiographic film in a chassis or supporting frame and the set wrapped in a plastic bag which is disposable after being used in the patient's mouth.

The X-ray antidiffusion screen, on the other hand, is based on a metallic mesh of horizontal and vertical threads having a definite thickness, forming a reticulation that perfoms the function of absorbing the secondary radiation produced by the action of primary X-rays on interacting with the matter of the body to be X-rayed avoiding to a great extent that the above mentioned secondary radiation affects the final image obtained, thus improving the sharpness and detail allowing a more accurate diagnosis.

The antidiffusion screen may be double, to enhance radiographic definition, through a juxtaposed double reticulation.

Thread reticulation and thickness are of such a dimension that when they are used in a system having a fine-grain intensifying screen and starting from the focal spot size of the X-ray equipment, to be used in dentistry, they do not leave any trace on the radiographic image of the finished film, since it is below the human eye resolution capability.

Nonetheless, in order to improve this quality to obtain a highly sharp and focused radiographic image that shall not show the radiophotography of the reticulation employed, the use of a separating plate is envisaged, which on increasing the distance between the reticulation and the film to be impressed by X-ray radiation, this dilutes even further as a shade becomes diffuse if the light bulb producing it, is moved away.

This separating plate, made of a compressible material allows a homogeneous separation between the reticulation and the film, and simultaneously a solidary contact between the parts.

In brief, this invention has the following advantages.

The patient undergoing radiologic exposure, receives a lower amount of radiation, which is a lower risk factor both for the patient and the operator, particularly if it is frequently repeated. Radiation reduction is a permanent concern of the World Health Organization, in order to reduce its deleterious effects.

Another advantage of this invention is that it enables the professional to obtain a radiographic impression to improve the diagnosis quality.

Another advantage is that it allows the use of a single-emulsified-face radiographic film.

Another advantage is that it allows to make emulsions with a lower content of silver salt(i.e. it is more economical).

Another advantage is that it allows the use of rechargeable chassis, where only the radiographic film is renewed (which entails another economic benefit).

Another advantage is associated with the X-ray apparatus itself which requiring a lower radiation emission, correlatively increases its useful life.

In order to obtain the advantages so briefly described, to which users and experts can add many others, there follows the description of a preferred embodiment which is diagrammatically illustrated without a definite scale in the enclosed pictures. It should be expressly pointed out that, since it is an example, no exclusive or restrictive character of the scope of protection of this invention should be attached to it, but rather, it has a merely explanatory and illustrative purpose concerning the basic line it is based on.

In said pictures:

PICTURE 1 illustrates in a diagrammatic way and with its elements slightly apart, in a perspective view, the components of the device of X-ray intensifying and anti diffusion screens for intra-oral dental radiographic plates.

PICTURE 2 shows in an example of embodiment, a disposable chassis or cassette.

PICTURE 3 shows in another example of embodiment a rechargeable film chassis or cassette.

PICTURE 4 shows a radiographic film emulsified on both faces receiving the radiation coming from an X-ray apparatus, obtaining a latent image of a set of dental pieces and presents, interposed between the dental pieces and the front face of the film, an intensifying screen, that by light emission, when irradiated by the X-rays, reimpresses the latent image, increasing the quality of the same, and a second intensifying screen acting in the same way in the back face of the film.

PICTURE 5 shows the radiographic film receiving the radiation coming from an X-ray apparatus, obtaining a latent image of a set of dental pieces, there being, interposed between it and the dental pieces, a plate with the reticulation of this invention that turns the focal rays into punctual and concentrated beams. Between them, there is a separating plate interposed which contributes to make the image of the reticulation imperceptible in the film.

In order to associate the above-mentioned drawings to the descriptive report below, a common reference number has been assigned to the similar parts or pieces appreciated in the different drawings.

According to what has been briefly anticipated, the DEVICE OF X-RAY INTENSIFYING AND ANTI DIFFUSION SCREENS FOR INTRA-ORAL DENTAL RADIOGRAPHIC PLATES we are dealing with consists of one or two intensifying screens, a front screen 1, and a back screen 2, if the radiographic film 3 has been provided with emulsion on both faces, these intensifying screens being emulsified with a component which is fluorescent under X-ray radiation, preferably composed of "rare earths", particularly Gadolinium or Lanthanum salts, which in addition to being sensitive to the X-ray radiation of film 3, is sensitive to the light emission of the fluorescence of the intensifying screens 1 and 2.

As is illustrated in picture 4, when a beam of primary X-rays 5 is emitted from an X-ray apparatus 4, on a set of dental pieces 6, said beam reaches film 3 after going through everything, and produces a latent image of the structure of the set of dental pieces 6. Both the front intensifying screen 1 and the back intensifying screen 2, in direct or indirect contact on said film 3, also receive radiation 5, producing luminosity which in its turn reinforces the latent image impressed on film 3, in this case on both faces.

But a film on which so many simultaneous latent images are impressed, increases in addition to its richess and quality of image, the non-desired side effects in the radiographic plate, such as the rebounds and reflections of X-rays, whose wave length does not benefit the final image.

In order to virtually eliminate this problem, the invention device is provided with an anti-diffusion reticulated screen 7, which is made of metallic threads of predetermined thickness arranged in horizontal and vertical rows (picture 5).

This reticulated screen (simple or double) 7 is interposed between the dental piece 6, when taking X-rays, and receives the emission of primary X-rays 5 emitted by the X-ray apparatus 4, and absorbs through the grille threads of the reticulation the secondary X-rays.

When going through the reticulation of the anti-diffusion screen 7, the radiation beam focus through the reticulation, concentrating itself and eliminating on the one hand the secondary, reflection or rebound X-rays for they are weaker, and increasing the primary X-rays 5, originally stronger, which determines a latent image of better diagnostic quality than the conventional ones.

Although the thickness of the threads and the reticulation is so small that it practically escapes observation by the human eye, a separating plate 8 is included between the anti-diffusion plate 7 and the film, creating a distance between the reticulation and the film, preventing by stumping the possibility that said reticulation might appear in image on the developed film, and allowing it to perform instead its excellent effects. This separating plate 8 is made of a compressible material that acting as a pad, allows a solidary and homogeneous contact between the film 3, and the anti-diffusion screen 7.

In order to avoid further rebounds, it is envisaged to include within the chassis or cassette a non-radiographic plate 9, behind the radiographic film 3, and the back intensifying plate 2, when pertinent.

All this radiographic set is included within a disposable chassis or cassette 10 (picture 2) or a removable chassis or cassette 11 (picture 3).

In both cases, the radiographic set is hermetically closed and it is protected by a front protective plate 12 and a back one 13.

In the case of the disposable chassis 10, the set is discarded after withdrawing the radiographic film 3. In the second case, only the radiographic film 3 is withdrawn, and replaced by a new one. In this latter case, the chassis 11 is covered with a disposable plastic cover.

This disposable chassis 10 allows to eliminate the individual packaging and to sell the film in bulk, with the consequent saving in cost and material.

With this invention's device, the useful life of the X-rays tubes is also extended, since they work with a smaller radiation amount. On the other hand, it enhances the capacity of low-yield equipment or of equipment which are worn out owing to their use.

From the above description and the representations of the annexed drawings, the constructive and functional advantages characterizing the invention under consideration stand out clearly, and we do not deem it necessary to go into further details in that respect. Therefore, we will delimit its boundaries and scope in the following claims.

I claim:

1. A device for intra-oral dental radiographic plates having intensifying and anti-diffusion screens comprising a hermetic cassette, a radiographic film disposed within said cassette and having opposed faces, said film having at least one emulsified face thereof sensitive to X-rays, at least one intensifying screen at a said at least one emulsified face of the film, said at least one intensifying screen being emulsified with one of gadolimium and lanthanum salts, an anti-diffusion plate disposed between an object to be X-rayed and the at least one intensifying screen at a face of the film and having a plurality of metallic threads arranged in rows at substantially right angles to each other, the distances between successive threads being such that they determine an image on the film which is below the human eye resolution capability, said gadolinium and lanthanum salts having grains smaller than the distances between said threads of said anti-diffusion plate.

2. A device as claimed in claim 1 and further comprising a separating plate of compressible material interposed between said anti-diffusion plate and said at least one intensifying screen.

3. A device as claimed in claim 1 and further comprising a non-radiographic plate adjacent the at least one intensifying screen on the side of the film away from the object being X-rayed.

* * * * *